(12) United States Patent
Ronneberger

(10) Patent No.: US 6,842,954 B2
(45) Date of Patent: Jan. 18, 2005

(54) GEAR TOOTH AND THREAD GRINDING MACHINE

(75) Inventor: Erich Ronneberger, Waldshut (DE)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 10/619,486

(22) Filed: Jul. 16, 2003

(65) Prior Publication Data

US 2004/0040133 A1 Mar. 4, 2004

(30) Foreign Application Priority Data

Sep. 3, 2002 (DE) .......................................... 102 40 509

(51) Int. Cl.⁷ .............................................. B23B 29/24
(52) U.S. Cl. ................................ 29/50; 29/51; 82/121; 451/65; 409/76
(58) Field of Search ............................... 29/50, 51, 55, 29/26 A, 27 C, 27 R, 40, 35.5, 39, 564, 565; 409/133, 73, 76; 82/121; 451/65, 66, 67

(56) References Cited

U.S. PATENT DOCUMENTS

| | | | | |
|---|---|---|---|---|
| 4,331,452 A | * | 5/1982 | Causey et al. ................. | 451/67 |
| 4,584,794 A | * | 4/1986 | Hirohata ....................... | 451/65 |
| 5,052,089 A | * | 10/1991 | Gadaud et al. ............. | 29/27 R |
| 5,341,551 A | * | 8/1994 | Brown et al. ................ | 29/27 C |
| 5,697,739 A | * | 12/1997 | Lewis et al. ................. | 409/230 |
| 5,857,896 A | | 1/1999 | Stollberg | |
| 6,003,415 A | * | 12/1999 | Turner et al. ................... | 29/40 |
| 6,279,438 B1 | * | 8/2001 | Delacou ...................... | 82/121 |
| 6,283,837 B1 | * | 9/2001 | Vorbuchner .................. | 451/66 |
| 6,336,777 B1 | | 1/2002 | Fisher et al. | |

FOREIGN PATENT DOCUMENTS

| | | |
|---|---|---|
| DD | 244 097 | 9/1985 |
| DE | 41 12 763 | 4/1991 |
| DE | 198 25 520 | 6/1996 |
| DE | 199 19 645 | 4/1999 |
| DE | 101 24 779 | 5/2001 |

* cited by examiner

Primary Examiner—A. L. Wellington
Assistant Examiner—Dana Ross
(74) Attorney, Agent, or Firm—Browdy and Neimark, P.L.L.C.

(57) ABSTRACT

The invention concerns a machine for the chip-forming machining and the measurement of gears and screw-type workpieces. Arranged on a swivel head (6) swivellable about an axis (A) at right angles to the rotary axis of the workpiece (4) are functional units (8a, 8b, 8c, 8d) with machining and measuring tools (10, 12, 14, 15, 17) which are displaceable radially and parallel relative to the swivel axis (A), which said tools can be brought consecutively into engagement with the workpiece (4), thus making possible the application of different tools (10, 12, 14, 15, 17) and machining techniques in the same work set-up without colliding. The work spindle (1) is driven by electric motor either directly or via a gear unit.

19 Claims, 2 Drawing Sheets

GEAR TOOTH AND THREAD GRINDING MACHINE

FIELD OF THE INVENTION

The invention concerns a machine for chip-forming machining. It serves for the grinding and measuring of gears and screw-type workpieces such as, for example, leadscrews, thread rolling dies and screw compressor screws.

BACKGROUND OF THE INVENTION

One of the widespread, proven principles for increasing the economic efficiency of the chip-forming machining of workpieces is the consecutive performance of various machining operations in a single work set-up. Examples of this are, amongst others, automatic lathes and production centers. With a number of different cutting tools on one or several different machining units, all workpiece outer surfaces are machined that are accessible for machining in the relevant work set-up. Measuring operations on the workpiece surface are also included in the automatic process sequence. A multifunctional production center can substitute for a number of machines with different functions and machining techniques such as turning, milling, drilling, grinding and measuring.

The limits lie on the one hand in the machinery costs, which increase with the degree of outfitting, i.e. the number of machining units, NC axes etc., and on the other hand in the time expenditure for setting the machining process. The setting work is chiefly a substantial expense factor in the case of machining medium sized and small series, where the machine is reset frequently.

An example of multifunctional workpiece machining in the field of gear tooth and thread grinding is described in DE 196 25 520. In the first machining operation the teeth of a precut and hardened gear are ground by means of a grinding worm arranged on a first machining unit; in the second honed by means of a honing gear arranged on a second machining unit. By means of a measuring unit the workpiece is centralized prior to the machining of the tooth flanks; i.e. the workpiece teeth are aligned to coincide with the threads of the grinding worm. On this machine however, due to its manner of construction, only gears can be machined. Moreover the machining techniques employed here, those of continuous profile grinding and generation honing, demand workpiece specific dressing tools for the grinding worm and honing stone. The resulting relatively long setting and re-setting times mean that in spite of the high productivity, the machine is not economically suitable for small series. The number of machining operations in a single work set-up is restricted to two.

On another machine found on the market, the precut teeth of a hardened gear are rough ground in the first operation by the continuous generation grinding method at a high material removal rate, and in the second operation the exact tooth flank profile is produced by index profile grinding. Due to the style of construction of the machine, this solution too is only suitable for machining gears. And here too the number of machining operations in the one work set-up is limited to two.

Universal solutions for multifunctional machining, such as those afforded by modern production centers for broad spectrums of round or cubic workpieces, for example, are unknown in the field of gear tooth and thread grinding.

SUMMARY OF THE INVENTION

It is an object of the present invention to provide a machine for chip-forming machining, in particular a grinding machine, on which both gears and screw-type workpieces can be machined economically with different tools and machining techniques in large, medium and small series production.

This object is attained with a machine for the chip-forming machining of gears and screw-type workpieces, comprising:

a. a work spindle for the accommodation of a gear or screw-type workpiece to be ground, the said spindle being located for rotation about a first axis on a first slide, b. a machine bed bearing the first slide, the first slide being displaceable parallel to the first axis, and c. a swivel head located for rotation about a second axis, wherein on the end front face of the swivel head directed towards the work spindle at least two, preferably four functional units are arranged, which are equipped with machining tools or measuring tools and wherein at least two of said functional units are arranged displaceable relative to the swivel head, where by said displacement relative to the swivel head and by swivelling of the swivel head said at least two of the functional units can be brought as required into active connection with the gear or screw-type workpiece to be machined.

The machine according to the invention is equally suitable for the chip-forming machining of the tooth flanks of gears and the threads of screw-type workpieces. It comprises a work spindle for accommodating the gear or screw-type workpiece to be machined, the said spindle being located for rotation about a first axis on a first slide, a machine bed carrying the first slide, the latter being displaceable parallel to the first axis, and a swivel head located for rotation about a second axis. Arranged on the front end face of the swivel head directed towards the work spindle are at least two, preferably four functional units which are fitted with machining tools or measuring tools. By altering the position relative to the swivel head and by swivelling the swivel head, at least two of these functional units can be brought as required into active connection with the gear or screw-type workpiece to be machined. The machining and measuring tools can thus be brought consecutively into engagement with the set up gear or screw-type workpiece, so that the application of different tools and machining techniques, such as e.g. continuous generation grinding, index profile grinding and honing, is possible in one and the same work set-up.

The functional units are best arranged for displacement radial and, depending on the function of the relevant functional unit, also parallel relative to the swivel axis of the swivel head. This in turn is swivellable or rotatable through at least +/−90°, preferably up to 360°.

The work spindle is best driven by an electric motor either directly or via a gear unit, according to the needs of the relevant machining operation.

Further advantageous embodiments ensue from the dependent claims.

BRIEF DESCRIPTION OF THE DRAWINGS

In the following the invention is explained in detail by way of a preferred embodiment, which is illustrated in the enclosed drawings. These depict.

DETAILED DESCRIPTION OF A PREFERRED EMBODIMENT

Figure 1:
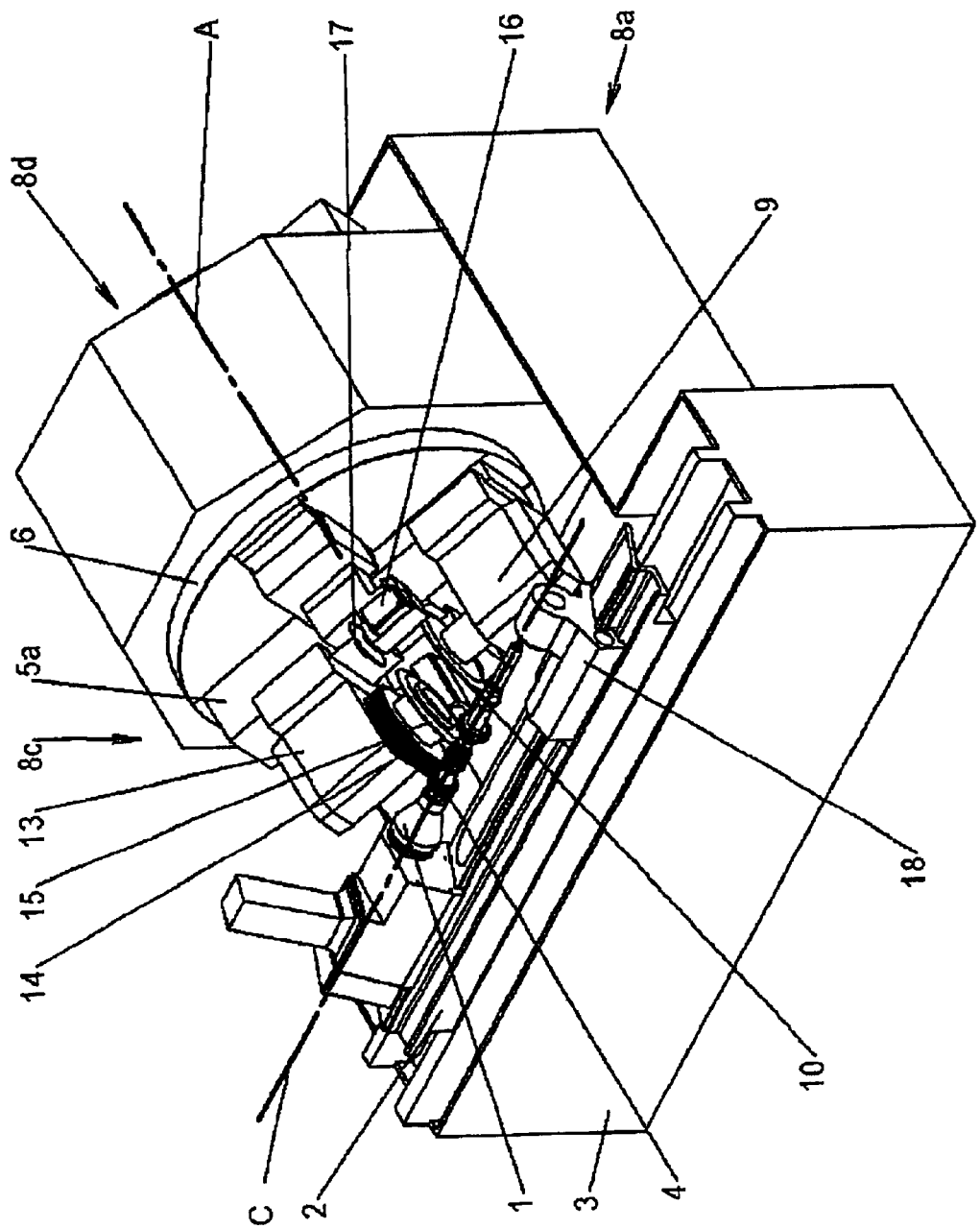
FIG. 1 the diagrammatic sketch of a gear tooth and thread grinding machine according to the invention, and FIG. 2 the diagrammatic sketch of a swivel head of a gear tooth and thread grinding machine acc. to FIG. 1.
Figure 2:
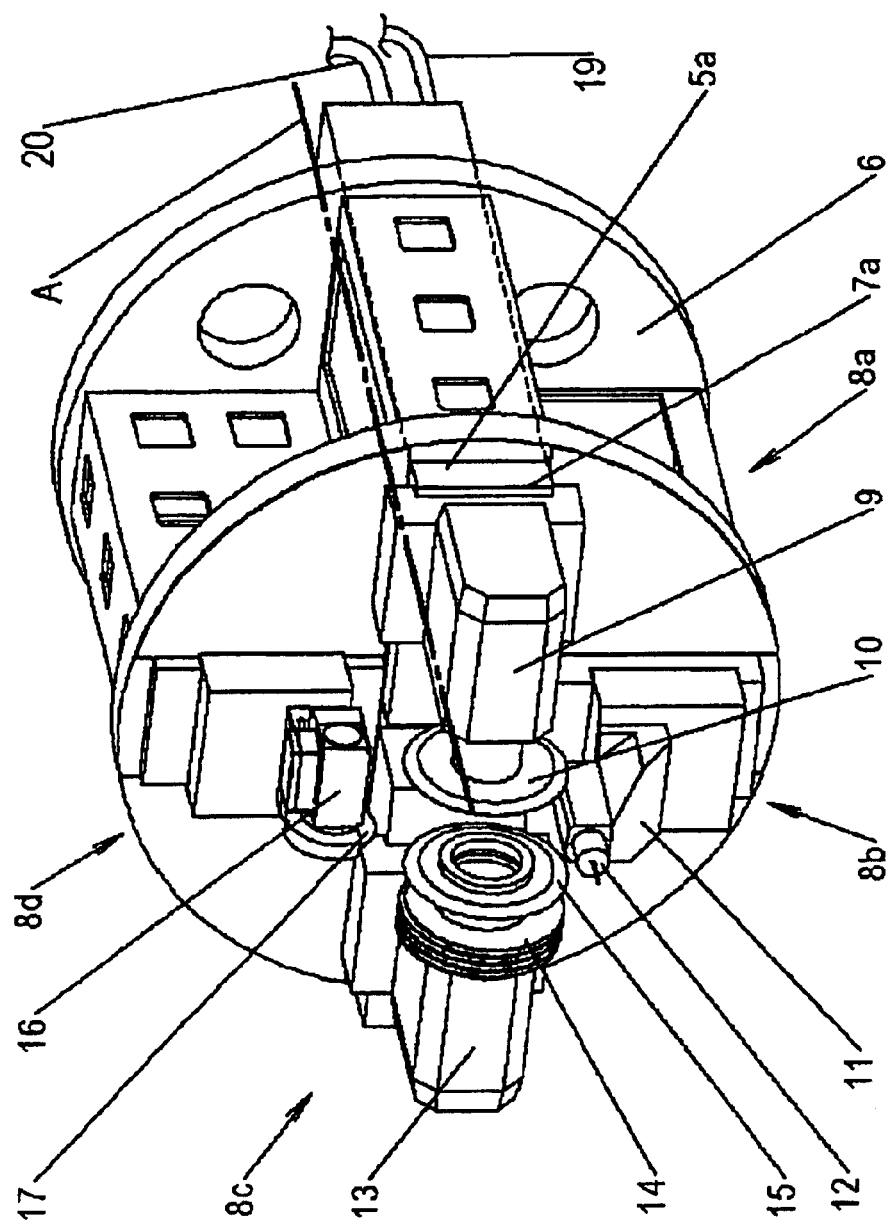

FIG. 1 depicts the view of a gear tooth and thread grinding machine from the operater side. A work spindle 1 for the accommodation of a workpiece 4 to be machined is located for rotation about a first axis C' on a work slide 2. The work slide 2 is located on a machine bed 3 in guideways for displacement parallel to rotary axis 2. Located in the section of the machine bed 3 opposite the work spindle 1 is a swivel head 6, which is swivellable about an axis A, preferably at right angles to axis C' and horizontal.

Arranged according to the invention on the front end face of the swivel head 6 directed towards the work spindle 1 are at least two—preferably up to four—functional units 8a, 8b, 8c, 8d. Depending on the intended application of the machine these functional units 8a, 8b, 8c, 8d are equipped with like or unlike machining tools 10, 14, 15, 17 or measuring tools 12. The functional units 8a, 8b, 8c, 8d can be arranged directly on the swivel head 6. It is an advantage, however, to arrange at least one of the functional units 8a, 8b, 8c, 8d on the front end faces of appropriate infeed slides. Up to four such infeed slides can be arranged inside the swivel head 6, located in guides for displacement parallel to the swivel axis A. For the sake of clarity, only one of the infeed slides is illustrated, which is indicated by the reference number Sa and its front end face by the reference number 7a. At least two, preferably all functional units are displaceable radially relative to swivel axis A on the swivel head 6 or on the end face of the relevant infeed slide. The power and coolant/lubricant supply 19, 20 to the functional units 8a, 8b, 8c, 8d and the signal exchange with the machine control unit are established according to the invention from the rear of the machine bed 3 through the swivel head 6 and/or the relevant infeed slide 5a. Exposed cable and hose transmissions which hinder access to the tooling in the working area of the machine are thereby avoided.

In the embodiment described here, the functional unit 8a arranged on the end face 7a of the infeed slide 5a is a first spindle unit 9 fitted with a first profile grinding wheel 10 for the grinding of a thread or gear teeth. The functional unit 8b is a measuring unit 11 for the measuring of the workpiece geometry via a measuring feeler 12. The functional unit 8c is a second spindle unit 13 fitted with a grinding worm 14 for the continuous generation grinding and a second profile grinding wheel 15 for the index profile grinding of gears. The functional unit 8d in this example is a dressing device 16 with a dressing disc 17 for the dressing of the grinding worm 14 and/or the profile grinding wheels 10, 15.

The displaceability of the functional units 8a, 8b, 8c, 8d radial to and/or parallel to the swivel axis A of the swivel head 6 make it possible to bring all machining and measuring tools into their working position consecutively without colliding.

Instead of the grinding tools 10, 14, 15, tools for gear honing and shaving can be employed as well as tools for other kinds of machining, such as bore, bevel and external round or unround grinding of gears and screw-type workpieces. Likewise instead of the measuring feeler 12, other common measuring instruments for measuring gear-type and screw-type workpieces can be employed.

By means of a work tailstock 18 arranged on the work slide 2 and displaceable in the direction of the rotary axis C' of the workpiece 4, both disc-shaped and shaft-shaped workpieces can be set up. To ensure that the speed range of the work spindle 1 is adequate for the workpiece to be machined while still fulfilling the high demands on the angular positioning accuracy and torsional stiffness of the workpiece 4, the work spindle 1 can be driven by electric motor either directly or via a mechanical speed reducing gear unit.

By the constructional arrangement of the workpiece 4 and the functional units 8a, 8b, 8c, 8d on the machine bed 3 according to the invention, it is thus possible on the one hand to perform several different operations consecutively on this machine in the same work set-up. On the other hand the machine is thereby suitable to machine and measure both gears and screw-type workpieces. Due to the relatively small moving masses of the infeed slide and the functional units, the machine is also especially suitable for the efficient machining of workpieces such as hobs and taps, which—due to the undercutting—demand a tool oscillation with high slide acceleration.

List of Reference Numbers
1 Work spindle
2 Work slide
3 Machine bed
4 Workpiece
5a Infeed slide
6 Swivel head
7a Front end face of the infeed slide Sa
8a Functional unit
8b Functional unit
8c Functional unit
8d Functional unit
9 First spindle unit
10 First profile grinding wheel
11 Measuring unit
12 Measuring feeler
13 Second spindle unit
14 Grinding worm
15 Second profile grinding wheel
16 Dressing device
17 Dressing disc
18 Work tailstock
19 Power supply
20 Coolant/lubricant supply
A Swivel axis of the swivel head
C' Rotary axis of the workpiece

What is claimed is:

1. Machine for the chip-forming machining of gears and screw-type workpieces, comprising:
   a. a work spindle for the accommodation of a gear or screw-type workpiece to be ground, the said spindle being located for rotation about a first axis on a first slide,
   b. a machine bed bearing the first slide, the first slide being displaceable parallel to the first axis, and
   c. a swivel head located for rotation about a second axis, wherein on the end front face of the swivel head directed towards the work spindle at least two, preferably four functional units are arranged, which are equipped with machining tools or measuring tools and wherein at least two of said functional units are arranged displaceable relative to the swivel head, where by displacement relative to the swivel head and by swivelling of the swivel head said at least two functional units can be brought as required into active connection with the gear or screw-type workpiece to be machined.

2. Machine according to claim 1, wherein the swivel head is swivellable through at least ±90°.

3. Machine according to claim 1 or 2, wherein the second axis is at right angles to the first axis.

4. Machine according to claim 2, wherein the functional units are arranged radially displaceable relative to the swivel head.

5. Machine according to claim 4, wherein at least one of the functional units is displaceable parallel to the swivel axis of the swivel head.

6. Machine according to claim 5, wherein the functional units displaceable parallel to the swivel axis are arranged on infeed slides, which are arranged inside the swivel head.

7. Machine according to claim 6, wherein every functional unit is equipped with a machining tool for the grinding, milling, honing, shaving, dressing or other chip-forming machining of a workpiece, or a measuring tool for the measurement of the workpiece geometry of gears and/or screw-type workpieces.

8. Machine according to claim 7, wherein a power supply and a coolant and/or lubricant supply to the functional units as well as a signal exchange between the functional units and a machine control system are taken from the back of the swivel head directed away from the work spindle, and lead through the said swivel head.

9. Machine according to claim 8, wherein the work spindle can be driven by electric motor either directly or via a speed reducing gear unit.

10. Machine according to claim 3, wherein at least one of the functional units is displaceable parallel to the swivel axis of the swivel head.

11. Machine according to claim 1, wherein at least one of the functional units is displaceable parallel to the swivel axis of the swivel head.

12. Machine according to claim 11, wherein the functional units displaceable parallel to the swivel axis are arranged on infeed slides, which are arranged inside the swivel head.

13. Machine according to claim 12, wherein a power supply and a coolant and/or lubricant supply to the functional units as well as a signal exchange between the functional units and a machine control system are taken from the back of the swivel head directed away from the work spindle, and lead through the said swivel head.

14. Machine according to claim 13, wherein the power supply and the coolant and/or lubricant supply and the signal exchange are lead through the allocated infeed slide.

15. Machine according to claim 1, wherein every functional unit is equipped with a machining tool for the grinding, milling, honing, shaving, dressing or other chip-forming machining of a workpiece, or a measuring tool for the measurement of the workpiece geometry of gears and/or screw-type workpieces.

16. Machine according to claim 1, wherein the work spindle can be driven by electric motor either directly or via a speed reducing gear unit.

17. Machine according to claim 1, wherein a power supply and a coolant and/or lubricant supply to the functional units as well as a signal exchange between the functional units and a machine control system are taken from the back of the swivel head directed away from the work spindle, and lead through the said swivel head.

18. Machine for the chip-forming machining of gears and screw-type workpieces, comprising:
 a. a work spindle for the accommodation of a gear or screw-type workpiece to be ground, the said spindle being located for rotation about a first axis on a first slide,
 b. a machine bed bearing the first slide, the first slide being displaceable parallel to the first axis, and
 c. a swivel head located for rotation about a second axis,
 wherein on the end front face of the swivel head directed towards the work spindle at least two, preferably four functional units are arranged, which are equipped with machining tools or measuring tools, where by displacement relative to the swivel head and by swivelling of the swivel head at least two functional units can be brought as required into active connection with the gear or screw-type workpiece to be machined, wherein the functional units are arranged radially displaceable relative to the swivel head.

19. Machine for the chip-forming machining of gears and screw-type workpieces, comprising:
 a. a work spindle for the accommodation of a gear or screw-type workpiece to be ground, the said spindle being located for rotation about a first axis on a first slide,
 b. a machine bed bearing the first slide, the first slide being displaceable parallel to the first axis, and
 c. a swivel head located for rotation about a second axis,
 wherein on the end front face of the swivel head directed towards the work spindle at least two, preferably four functional units are arranged, which are equipped with machining tools or measuring tools, where by displacement relative to the swivel head and by swivelling of the swivel head at least two functional units can be brought as required into active connection with the gear or screw-type workpiece to be machined, wherein at least one of the functional units is displaceable parallel to the swivel axis of the swivel head and wherein the functional units displaceable parallel to the swivel axis are arranged on infeed slides, which are arranged inside the swivel head.

* * * * *